Patented Apr. 6, 1954

2,674,587

UNITED STATES PATENT OFFICE 2,674,587

PIGMENT COMPRISING RESIN COATED CLAY PARTICLES

Thomas Gostage Leek, New York, N. Y., assignor to Edgar Brothers Company, Metuchen, N. J., a corporation of New Jersey No Drawing. Continuation of application Serial No. 48,760, September 10, 1948. This application November 24, 1951, Serial No. 258,098

5 Claims. (Cl. 260—38)

This invention relates to a clay pigment. It relates particularly to a new product or pigment comprising clay and condensation product usable as a filler, as a coating material and otherwise and having important advantages over clay-containing compositions heretofore used for analogous purposes.

This application is a continuation of my abandoned copending application Serial No. 48,760, filed September 10, 1948, which in turn is in part a continuation of my abandoned application Serial No. 551,059, filed August 24, 1944.

My invention has great utility in the paper making art, so for purposes of explanation and illustration it will be described in connection with its application to that art and particularly the provision of a coating material and a filling material for paper. The invention is not so limited but also has utility in other arts, as, for example, rubber making, etc.

I have found that by spray-drying a mixture of clay and a water dispersion or water solution of a water-dispersible and/or water soluble condensation product of an aldehyde and at least one material of the group consisting of urea, phenol and melamine a powder is formed which, when dispersed with an adhesive, such as starch, casein, etc., produces a paper coating material which imparts superior properties to paper coated with it. The coating material may also be used for coating webs other than paper, such, for example, as fabric webs or fibers before the webs are formed, with greatly improved results. The word "web" as used herein comprehends such fibers. The powder above mentioned may be used to great advantage in filling as well as in coating paper. It may also be used quite independently of the paper art as a reinforcing agent for rubber and otherwise.

When a mixture of clay and a water dispersion or water solution of a water-dispersible and/or water soluble condensation product of an aldehyde and at least one material of the group consisting of urea, phenol and melamine is spray-dried there results a clay-containing composition comprising particles composed of a portion of clay and a portion of condensation product physically joined together. The product is in powder form. The condensation product tends to coat the clay and the spray-drying normally results in a powder comprising particles of clay individually coated with condensation product.

In order that the clay-containing composition may function to optimum advantage in the uses to which it is put, the condensation product therein should be capable of further condensation or polymerization. To effect this result the mixture of clay and dispersion or solution of condensation product is spray-dried at a temperature above the polymerization or condensation temperature of the condensation product but for a time so limited as to prevent undue advancement of the condensation product. In this way there are formed particles of clay individually coated with the condensation product while the condensation product coating the clay particles remains capable of further polymerization or condensation. The word "advancement" is used herein as a generic term of definition to include polymerization and condensation.

My clay-containing composition has a number of important advantages. Viewed in connection with its use for the coating of webs it has improved storage life and is much more easily handled than a substance such as resin in aqueous dispersion or solution with a clay slip. While the condensation product which I employ may be a resin, the condensation product in the clay-containing composition is desirably in partly advanced condition and in solid form so that the spray-dried material may be stored virtually indefinitely without deterioration. In contrast, resin in water dispersion or solution has a relatively short life, sometimes only a few days and at most only a few months, after which it becomes useless for the purposes here under discussion. By the same token such a dispersion or solution containing clay has a relatively short life. The water dispersion or solution is also undesirable from the standpoint of ease and expense of handling. The spray-dried material, being substantially free of water, is much more easily handled, does not bulk as large as the dispersion or solution, is not subject to freezing and, being in powder form, does not increase in viscosity at low or normal storage temperature as the liquid does. Because of its physical state it can be more conveniently handled with much simpler facilities insofar as the paper maker is concerned. He does not require storage tanks or piping for handling.

The spray-dried material when made into an aqueous dispersion, preferably with starch or other adhesive, and applied to paper forms a superior coating with a lesser amount of expensive raw material. Papers coated with such a coating material respond very favorably to the standard wax test and uniformly give higher values than if the same ingredients are mixed in aqueous dispersion in the ordinary way.

I have found that when the spray-dried material is to be used for coating paper or other web excellent results are obtained by spray-drying an admixture of clay and a water dispersion or water solution of a water dispersible and/or water soluble condensation product of an aldehyde and at least one material of the group consisting of urea, phenol and melamine, forming a water dispersion of the spray-dried material with starch and applying the same to the web. Desirably between about 5 and about 30 parts of clay by weight to one part of condensation product are employed. The preferred proportion is 20 parts of clay to one part of condensation product. The starch should have a weight at least about 10% of the weight of the spray-dried material employed, preferably about 15%. The starch is preferably cooked in the usual way.

The coating material consisting of a water dispersion of the spray-dried clay-containing composition herein described and starch is applied to the web in the usual way. The coated web is calendered. The coated web may be heat treated to advance the condensation product or if an appropriate catalyst is employed the condensation product may be allowed to advance by standing at room temperature. I find it advantageous to calender the coated web cold and thereafter heat treat the calendered web. For best results, I find, the coated and cold-calendered web should be subjected to temperatures up to 212° F. or somewhat higher for a period ranging between about fifteen and about twenty-five minutes.

Preferably I adjust the acidity of the dispersion of spray-dried composition, as by the addition of an accelerator such as ammonium chloride or other suitable catalyst to a pH value approximating the optimum pH value for polymerization of the condensation product. For example, I adjust the acidity of a dispersion of a spray-dried composition of clay and urea-formaldehyde resin by adding ammonium chloride to bring the dispersion to a pH value of about 4.5, which is the optimum pH value for polymerization of urea-formaldehyde resin.

Coated papers prepared as above explained exhibit properties markedly superior to papers coated with an admixture of resin in aqueous dispersion or solution with a clap slip. The wax test indicia are several points higher. The coating is relatively tenacious or adherent to the paper and the paper exhibits superior water-repellent properties and better finish (higher gloss). My coating process is claimed in my Patent No. 2,414,313, issued upon my application Serial No. 621,162, filed October 8, 1945, which application was a division of my above mentioned application Serial No. 551,059.

As mentioned above, the spray-dried clay-containing composition may also be used to advantage as a filler in paper making. The spray-dried clay-containing composition with starch is applied to ligno-cellulose material in water dispersion form. The ligno-cellulose material is admixed with the dispersion of the spray-dried clay-containing composition in which the condensation product is in uncured form and the admixture is formed into a web in any suitable paper making process. The paper is of superior strength after drying and heating to advance the condensation product. My method of making paper is claimed in my copending application Serial No. 48,759, filed September 10, 1948, which is a division of my above-mentioned application Serial No. 48,760 and is also in part a continuation of my copending application Serial No. 621,161, filed October 8, 1945.

An advantage of the spray-drying process as applied to the preparation of my product is that the condensation product is not completely condensed in the process. This makes it possible for the spray-dried material to be incorporated in the ultimate product and thereafter advanced to completion. Complete polymerization or condensation of the condensation product during spray-drying is avoided by limiting the time during which the material is subjected to a temperature above the condensation temperature of the condensation product to prevent complete advancement. This can be done because the time required for the spray-drying of the material is less than the time required for complete advancement of the condensation product.

Generally the condensation products which I employ are resinous but this is not necessarily always the case as I may employ such compounds as dimethylol urea or initial condensation products which are methylol compounds and non-resinous in nature. In preparation of the condensation product the major reactants are an aldehyde and at least one material of the group consisting of urea, phenol and melamine although other minor reactants which do not adversely affect the characteristics of the product for my purposes may be employed. I preferably employ a suitable catalyst. A condensation product must be selected which is water-dispersible and/or water soluble and the spray-drying must be so carried out, as above explained, that the spray-dried composition containing clay and condensation product is capable of further advancement. Such further advancement may be effected either through the application of heat or through the addition of an accelerator with or without the application of heat.

I generally prefer to employ condensation products made with formaldehyde although other aldehydes may be used.

I shall give an example of the preparation of my product. A water-dispersible condensation product of an aldehyde and at least one material of the group consisting of urea, phenol and melamine is intimately associated with an aqueous slurry of clay along with sufficient acid or alkali to adjust the pH of the mixture to the point of maximum stability of the condensation product. To promote optimum dispersion of the clay a suitable dispersing or wetting agent may be employed; examples: sodium tetrapyrophosphate, trisodium phosphate. The mixture thus formed is introduced into the spray chamber through a suitable spray-head or mechanical atomizer. In the spray chamber the water is vaporized and the physically bonded clay and condensation product is subsequently separated from the exhaust vapor stream. This may be accomplished by any suitable mechanism such as a cyclone separator.

The optimum conditions for spray-drying vary according to the characteristics of the particular spray-drying equipment utilized, the particular condensation product employed, the weight ratio between condensation product and clay and the proportion of water in the slurry. The clay and the water dispersion or water solution of condensation product may be admixed to make a slurry at room temperature. The slurry is fed into the spray dryer where it is treated by admixture with heated gas (e. g., air or products of combustion). I relate the temperature of the gas as introduced into the spray drying chamber to the rate of feed of the slurry into the spray drying chamber so that at the upper reaches of the chamber where the high temperature gas comes in contact with the atomized slurry not all of the moisture in the slurry is driven off. The result is that the condensation product is maintained at a temperature not substantially higher than 212° F. and hence below the maximum temperature of condensation of the condensation product. The partly dried clay particles fall by gravity through the spray drying chamber. During falling of the clay particles further evaporation of water thereon occurs, the heat previously absorbed by the clay and condensation product assisting in the evaporation. Thus the temperature of the clay and the condensation product thereon is lowered below 212° F. and continues to drop as the clay particles covered with condensation product fall to the bottom of the drying chamber, the withdrawal of heat from the clay due to the evaporation of the moisture on the clay particles having a refrigerating effect on the condensation product to rapidly cool it to inhibit its advancement.

I shall give specific examples of the preparation of my product employing particular condensation products.

Example 1

A slurry is made by mixing together the following ingredients in the amounts stated:

| | Grams |
|---|---|
| Water | 50,000 |
| Water-dispersible urea-formaldehyde resin dispersion 70% N. V.[1] | 1,700 |
| Ammonium hydroxide 28% strength | 316 |
| Tetra sodium pyrophosphate | 25 |
| Clay | 22,680 |

[1] Non-volatile.

The mixing is effected at a temperature of the order of 68° F. The slurry is fed into the spray dryer. The heated gas supplied to the drying chamber is between 500 and 575° F. The rate of feed of the slurry into the drying chamber is such that the temperature of the vapor delivered from the drying chamber is between 140 and 150° F. The spray-dried product is removed from the exhaust vapor stream by means of a cyclone separator.

Example 2

A slurry is made by mixing together the following ingredients in the amounts stated:

| | Grams |
|---|---|
| Water | 50,000 |
| Water soluble phenol-formaldehyde resin solution 50% N. V. | 2,264 |
| Tetra sodium pyrophosphate | 25 |
| Clay | 22,680 |

The procedure is the same as the procedure in Example 1.

Example 3

A slurry is made by mixing together the following ingredients in the amounts stated:

| | Grams |
|---|---|
| Water | 50,000 |
| Water soluble melamine-formaldehyde resin solution 60% N. V. | 1,886 |
| Trisodium phosphate | 20 |
| Clay | 22,680 |

The procedure is the same as the procedure in Examples 1 and 2.

In each of Examples 1, 2 and 3 the resulting spray-dried product contains approximately 3% of water or less and is a free-flowing powder which can be readily made into a slurry with water.

The water-dispersible and/or water soluble condensation product may be prepared by any suitable method; see, for example Patent No. 2,428,752.

While I have described certain present preferred embodiments of the invention it is to be distinctly understood that the invention is not limited thereto but may be otherwise variously embodied within the scope of the following claims.

I claim:

1. A pigment comprising discrete particles in solid state of clay individually coated with a condensation product of formaldehyde and at least one material of the group consisting of (a) urea, (b) phenol and (c) melamine, which condensation product is capable of further advancement, prepared by spray-drying an aqueous mixture of clay and one of the group consisting of (i) a water solution of said condensation product and (ii) a water dispersion of said condensation product.

2. A pigment comprising a powder consisting of discrete particles in solid state composed of between about 5 and about 30 parts by weight of clay and one part by weight of a condensation product of formaldehyde and at least one material of the group consisting of (a) urea, (b) phenol and (c) melamine, said portions being physically joined together, the condensation product being capable of further advancement, prepared by spray-drying an aqueous mixture of clay and one of the group consisting of (i) a water solution of said condensation product and (ii) a water dispersion of said condensation product.

3. A pigment comprising a powder made up of discrete particles in solid state of clay coated with a condensation product of formaldehyde and urea, which condensation product is capable of further advancement, prepared by spray-drying an aqueous mixture of clay and one of the group consisting of (i) a water solution of said condensation product and (ii) a water dispersion of said condensation product.

4. A pigment comprising a powder made up of discrete particles in solid state of clay coated with a condensation product of formaldehyde and phenol, which condensation product is capable of further advancement, prepared by spray-drying an aqueous mixture of clay and one of the group consisting of (i) a water solution of said condensation product and (ii) a water disperson of said condensation product.

5. A pigment comprising a powder made up of discrete particles in solid state of clay coated with a condensation product of formaldehyde and melamine, which condensation product is capable of further advancement, prepared by spray-drying an aqueous mixture of clay and one of the group consisting of (i) a water solution of said condensation product and (ii) a water dispersion of said condensation product.

References Cited in the file of this patent

UNITED STATES PATENTS

| Number | Name | Date |
|---|---|---|
| 1,720,062 | Seebach | July 9, 1929 |
| 2,314,181 | Winterkorn | Mar. 16, 1943 |
| 2,326,725 | Jayne et al. | Aug. 10, 1943 |